US010814971B2

(12) United States Patent
Hampton et al.

(10) Patent No.: US 10,814,971 B2
(45) Date of Patent: Oct. 27, 2020

(54) TAIL ROTOR HOUSING

(71) Applicant: Bell Helicopter Textron Inc., Fort Worth, TX (US)

(72) Inventors: Dalton T. Hampton, Fort Worth, TX (US); Andrew Paul Haldeman, Fort Worth, TX (US); Aaron Alexander Acee, Flower Mound, TX (US); Matthew John Hill, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 285 days.

(21) Appl. No.: 15/949,660

(22) Filed: Apr. 10, 2018

(65) Prior Publication Data
US 2019/0308722 A1 Oct. 10, 2019

(51) Int. Cl.
*B64C 27/82* (2006.01)
*B64C 27/06* (2006.01)

(52) U.S. Cl.
CPC ............. *B64C 27/82* (2013.01); *B64C 27/06* (2013.01); *B64C 2027/8254* (2013.01)

(58) Field of Classification Search
CPC . B64C 27/82; B64C 27/06; B64C 2027/8272; B64C 2027/8281; B64C 27/32; B64C 2027/8227; B64C 2027/8254
See application file for complete search history.

(56) References Cited

U.S. PATENT DOCUMENTS

| 4,660,785 | A | * | 4/1987 | Munski | B64C 27/82 244/17.19 |
| 4,809,931 | A | * | 3/1989 | Mouille | B64C 27/82 244/17.11 |
| 5,131,604 | A | * | 7/1992 | Yoerkie, Jr. | B64C 27/82 244/17.19 |
| 5,810,285 | A | * | 9/1998 | LeMasurier | B64C 27/82 244/17.19 |

(Continued)

FOREIGN PATENT DOCUMENTS

| EP | 2883791 A1 | 6/2015 |
| FR | 1559087 A | 3/1969 |

OTHER PUBLICATIONS

European Exam Report in related European Patent Application No. 18181177.9, dated Jan. 24, 2019, 6 pages.

(Continued)

*Primary Examiner* — Assres H Woldemaryam
(74) *Attorney, Agent, or Firm* — Lightfoot & Alford PLLC

(57) ABSTRACT

Systems and methods include providing an aircraft with a tail rotor system having a tail rotor housing that forms a cambered airfoil between an upper cambered surface and a lower cambered surface of the tail rotor housing. The cambered airfoil design of the tail rotor housing is capable of providing sufficient lifting force of an aircraft to offload the tail rotor during forward flight, thereby eliminating the need for a traditional vertical stabilizer or fin. The tail rotor blades of the tail rotor system are disposed within an (Continued)

aperture in the tail rotor housing, which minimizes or preferably eliminates exposure of the tail rotor blades to edgewise airflow typically encountered during forward flight, thereby allowing rigid rotor hubs, both in-plane and out-of-plane, to be used in the tail rotor system while also reducing noise output of the tail rotor system.

20 Claims, 5 Drawing Sheets

(56) References Cited

U.S. PATENT DOCUMENTS

| | | | | |
|---|---|---|---|---|
| 8,061,962 B2 * | 11/2011 | Marze | ................... | B64C 27/82 |
| | | | | 415/1 |
| 8,827,201 B2 * | 9/2014 | Alfano | ................. | B64C 1/0009 |
| | | | | 244/17.11 |
| 2006/0169835 A1 * | 8/2006 | Maille | ................. | B29C 70/342 |
| | | | | 244/17.19 |
| 2015/0158584 A1 * | 6/2015 | Mores | ................... | B64C 27/82 |
| | | | | 244/17.21 |
| 2016/0009387 A1 * | 1/2016 | Kummer | ............ | B64C 29/0025 |
| | | | | 244/6 |
| 2020/0094981 A1 * | 3/2020 | Klein | ................ | G06F 16/9017 |

OTHER PUBLICATIONS

European Search Report in related European Patent Application No. 18181177.9, dated Jan. 2, 2019, 4 pages.

\* cited by examiner

TAIL ROTOR HOUSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In flight, aircraft are subjected to various aerodynamic forces as a result of the design, flight characteristics, and operating parameters of a particular aircraft. Environmental factors also play a role in the aerodynamic forces experienced by an aircraft. Rotorcraft are particularly sensitive to such aerodynamic forces since rotorcraft have not only forward flight capability, but also hover and lateral mobility capability. To provide yaw stability, rotorcraft typically employ either a traditional open tail rotor or a ducted fan at an aft end of an empennage or tail boom of the rotorcraft. The traditional open tail rotor is light and produces less drag than the ducted fan, but the hub design for the traditional open tail rotor is generally more complex in order to accommodate edge-wise airflow encountered during forward flight. The ducted fan can utilize a simpler hub design, but is often larger, heavier, and produces more drag than the traditional open tail rotor.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
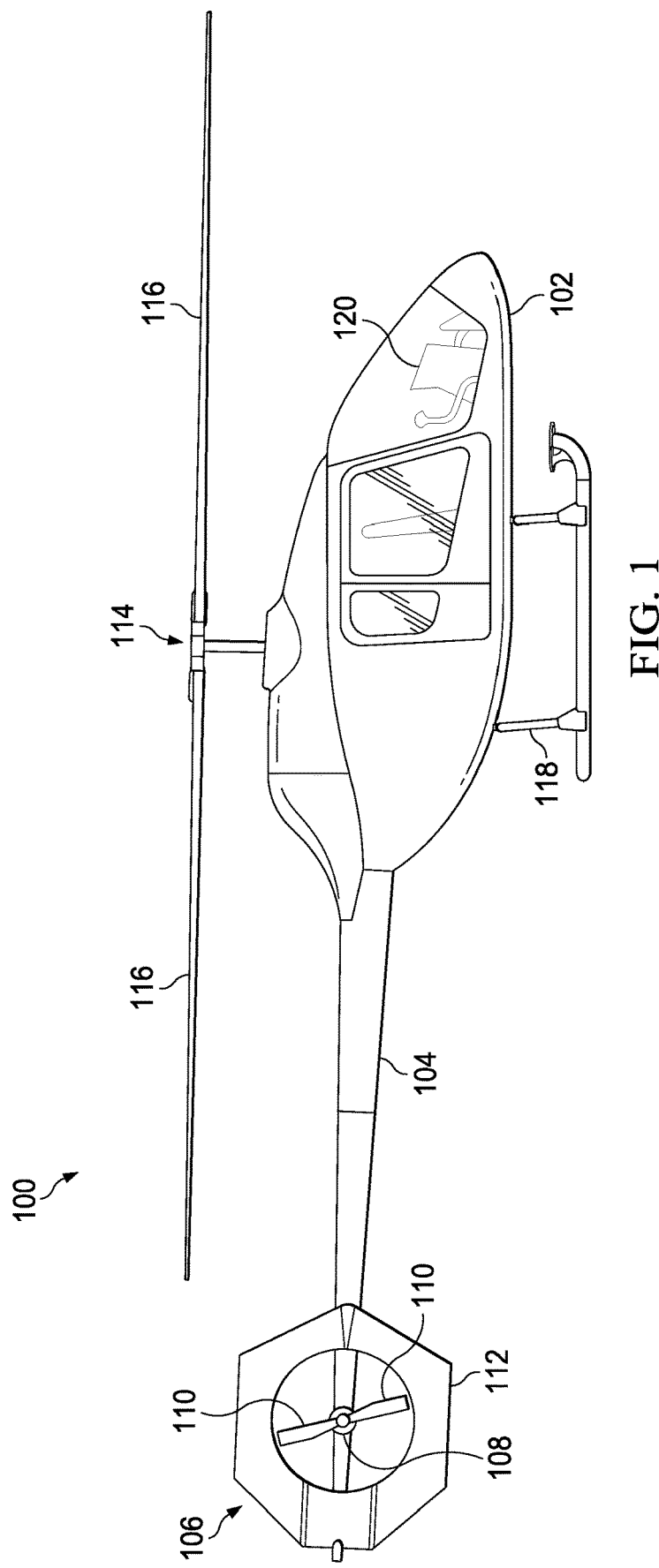
FIG. 1 is a side view of a helicopter according to this disclosure.
Figure 2:
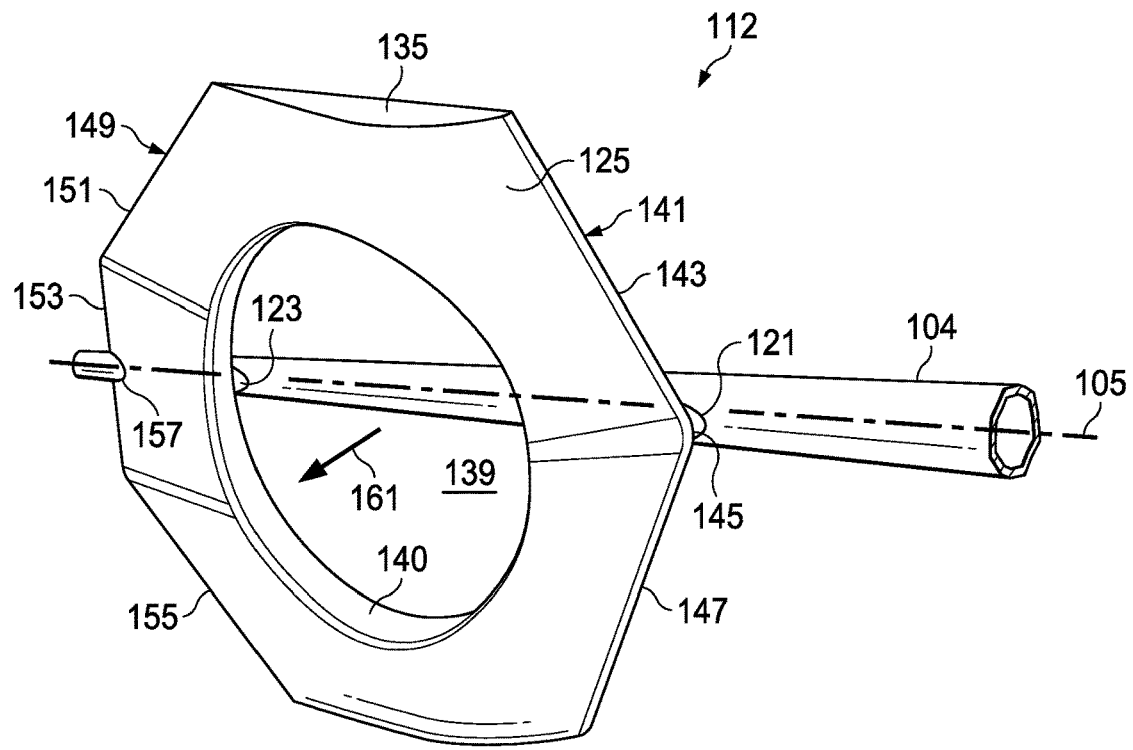
FIG. 2 is an oblique view of a tail rotor housing of the helicopter of FIG. 1.
Figure 3:
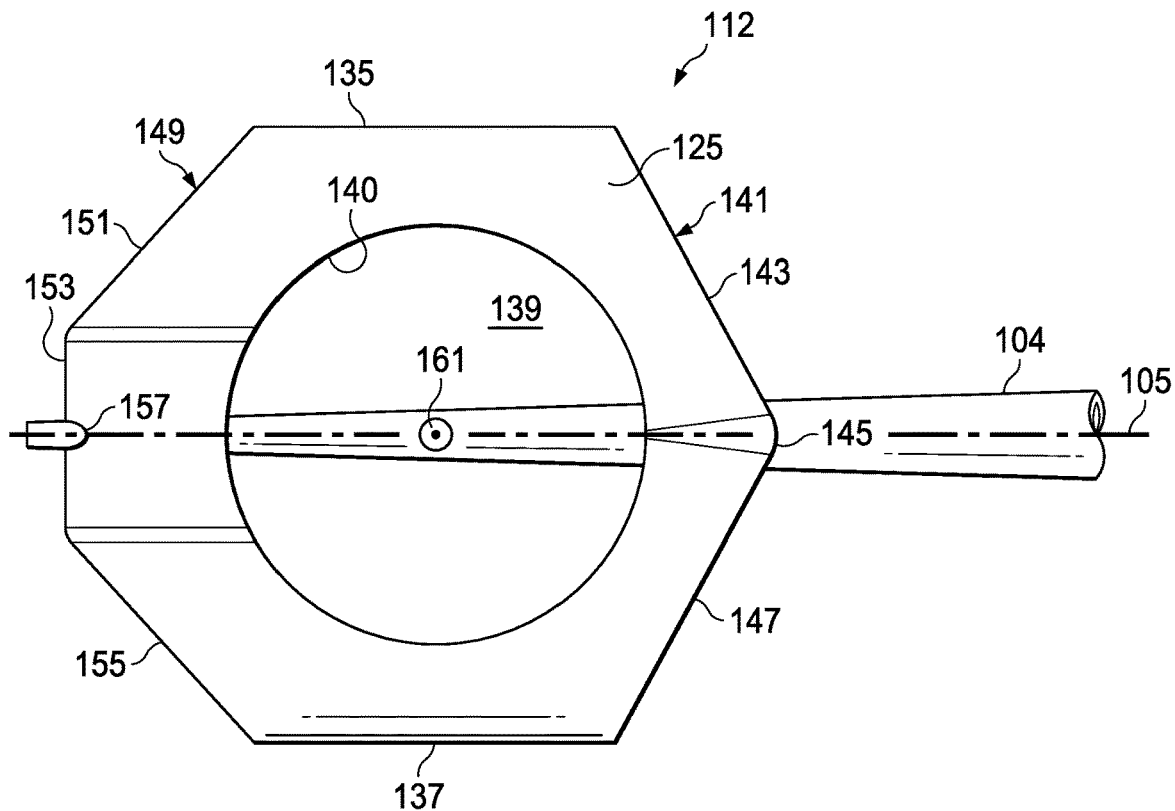
FIG. 3 is a side view of a tail rotor housing of FIG. 2.
Figure 4:
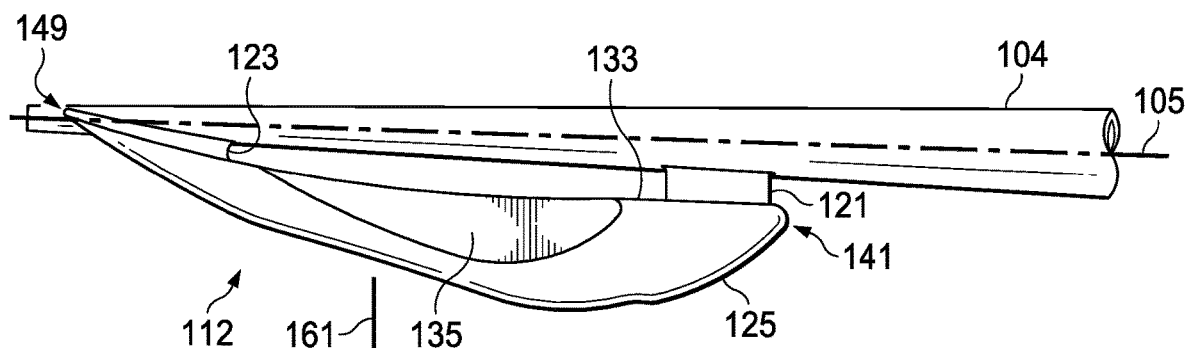
FIG. 4 is a top view of the tail rotor housing of FIG. 2.
Figure 5:
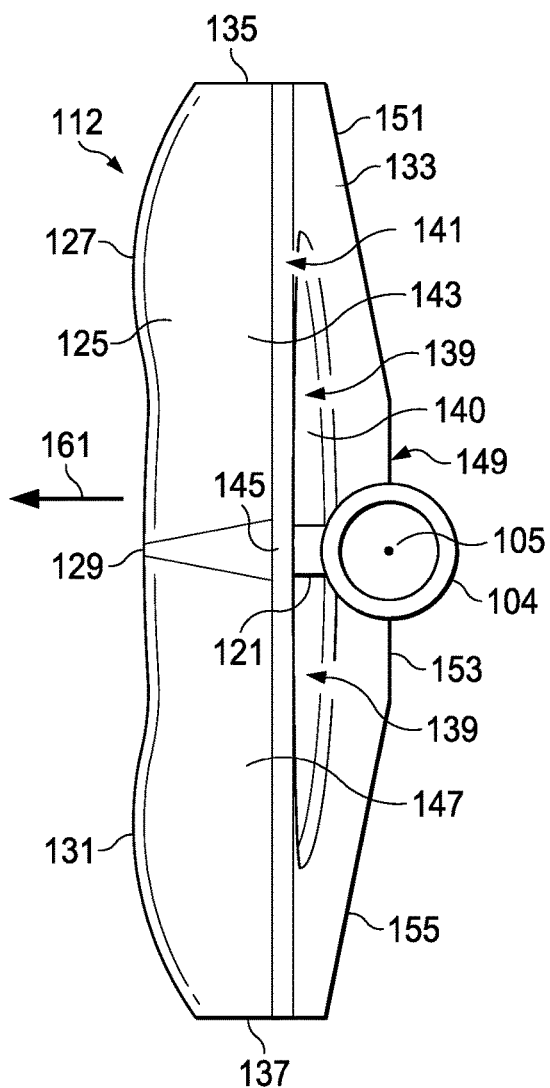
FIG. 5 is a front view of the tail rotor housing of FIG. 2.

Referring to FIG. 1, a side view of a helicopter 100 is shown. Helicopter 100 comprises a fuselage 102 and an empennage or tail boom 104. Helicopter 100 also comprises a tail rotor assembly 106 disposed on an aft end of the tail boom 104. The tail rotor assembly 106 comprises a tail rotor 108 comprising a plurality of tail rotor blades 110. Additionally, the tail rotor assembly 106 also comprises a tail rotor housing 112. Helicopter 100 further comprises a main rotor system 114 having a plurality of main rotor blades 116 that are selectively rotatable to provide vertical lift to the helicopter 100. A landing gear or skid 118 is attached to the fuselage 102 and configured to support the helicopter 100 when the helicopter 100 is grounded. Helicopter 100 also comprises a flight control system 120, which may, for example, include hardware and/or software for controlling the helicopter 100 during operation. Still further, while not shown, helicopter 100 may also comprise a combustion engine configured to propel the helicopter 100 during forward flight.

Referring to FIGS. 2-6, oblique, side, top, front, and cross-sectional top views of the tail rotor housing 112 of helicopter 100 are shown, respectively. As viewed from the top, the tail rotor housing 112 generally comprises a relatively thin, cambered airfoil composite that is attached to the tail boom 104 by a forward attachment 121 and an aft attachment 123 that define the angle of attack of the tail rotor housing 112. The tail rotor housing 112 comprises an upper cambered skin or surface 125, that when viewed from the top, comprises an outwardly curved or convex profile with respect to a chord line of the tail rotor housing 112. In the embodiment shown, the front profile of the upper cambered surface 125 comprises an upper curve 127, a smaller center curve 129, and a lower curve 131. The upper curve 127 and the lower curve 131 are generally symmetrical and comprise a larger thickness as compared to the center curve 129. However, in alternative embodiments, the front profile of the upper cambered surface 125 may be smooth and not comprise the upper curve 127, smaller center curve 129, or lower curve 131.

The tail rotor housing 112 also comprises a cambered inner skin or surface 133, that when viewed from the top, comprises an inwardly curved or concave profile with respect to the chord line of the tail rotor housing 112. Collectively, the upper cambered surface 125 and the lower cambered surface 133 form a heavily cambered airfoil. The lower cambered surface 133 also provides the mounting surface for the tail rotor housing 112 at each of the forward attachment 121 and aft attachment 123. A substantially flat top surface 135 and a substantially flat bottom surface 137 are disposed between the upper cambered surface 125 and the lower cambered surface 133 on each of a top and bottom of the tail rotor housing 112, respectively. However, in some embodiments, the top surface 135 and the bottom surface 137 may be curved or comprise another aerodynamically preferable shape or profile. Further, in other embodiments, the tail rotor housing 112 may not comprise the top surface 135 and the bottom surface 137, such that the upper cambered surface 125 and the lower cambered surface 133 are joined continuously about their respective perimeters.

Figure 6:
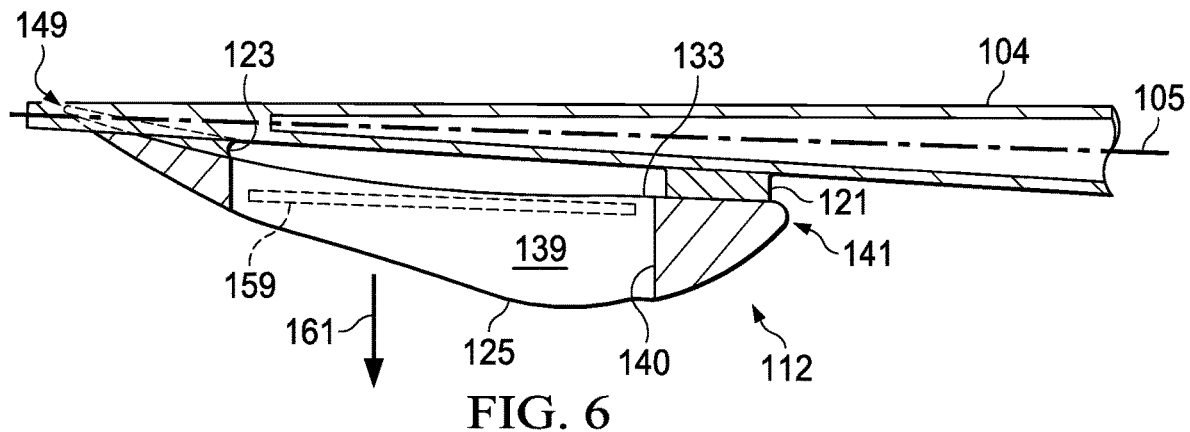
FIG. 6 is a cross-sectional top view of the tail rotor housing of FIG. 2.

The tail rotor housing 112 also comprises an aperture 139 disposed through each of the upper cambered surface 125 and the lower cambered surface 133. The aperture 139 generally comprises a walled duct 140 connecting the upper cambered surface 125 and the lower cambered surface 133. When the tail rotor housing 112 is attached to the tail boom 104, the aperture 139 is configured to receive and/or house at least a portion of the tail rotor 108 and the associated tail rotor blades 110. As shown in the embodiment of FIG. 6 by a footprint 159 of the tail rotor blades 110, the tail rotor blades 110 are entirely disposed within the aperture 139. However, in other embodiments, a portion of the tail rotor blades 110 may slightly protrude from the aperture 139. In some embodiments, the aperture 139 may be substantially axially aligned with an axis of rotation of the tail rotor 108, such that the axis of rotation of the tail rotor 108 intersects a longitudinal axis 105 of the tail boom 104. While the embodiment of the tail rotor housing 112 shown comprises a single aperture 139, other embodiments of the tail rotor housing 112 may comprise multiple apertures 139 configured to each house a tail rotor 108 and associated tail rotor blades 110. As will be discussed in greater detail herein, by disposing the tail rotor blades 110 within the aperture 139, the tail rotor housing 112 minimizes and/or preferably eliminates exposure of the tail rotor blades 110 to edgewise airflow during forward flight of the helicopter 100.

As viewed from the side, the tail rotor housing 112 comprises a seven-sided, substantially symmetrical profile relative to a longitudinal axis 105 of the tail boom 104. In the embodiment shown, the tail rotor housing 112 comprises a V-shaped leading edge 141 having an upper angled leading edge portion 143 and a lower angled leading edge portion 147 that are connected at a leading edge center point 145. In some embodiments, the leading edge center point 145 may be vertically aligned with the longitudinal axis 105 of the tail boom 104. Accordingly, in some embodiments, the upper angled leading edge portion 143 and the lower angled leading edge portion 147 may be substantially symmetrical about the leading edge center point 145 and/or the longitudinal axis 105 of the tail boom 104. However, in other embodiments, the leading edge center point 145 may be offset from the longitudinal axis 105 of the tail boom 104. Additionally, in other embodiments, the leading edge 141 may comprise any other profile or shape.

The tail rotor housing 112 also comprises a three-sided trailing edge 149 having an upper angled trailing edge portion 151, a vertical trailing edge portion 153 that may be perpendicular to the longitudinal axis 105 of the tail boom 104, and a lower angled trailing edge portion 155. In some embodiments, the upper angled trailing edge portion 151 and the lower angled trailing edge portion 155 may be substantially symmetrical about the vertical trailing edge portion 153 and/or the longitudinal axis 105 of the tail boom 104. Additionally, in some embodiments, the tail boom 104 may intersect the vertical trailing edge portion 153, so that the upper angled leading edge portion 143 and the upper angled trailing edge portion 151 are joined by the top surface 135, while the lower angled leading edge portion 147 and the lower angled trailing edge portion 155 are joined by the bottom surface 137. The vertical trailing edge portion 153 comprises a recess 157 configured to receive at least a portion of the tail boom 104 therethrough. This allows the trailing edge 149 of the tail rotor housing 112 to overlap at least a portion of the tail boom 104 in order to provide the tail rotor housing 112 a heavily cambered airfoil-shaped structure that terminates on an opposing side of the longitudinal axis 105 of the tail boom 104 relative to the attachments 121, 123. However, in alternative embodiments, the side profile of the tail rotor housing 112 may comprise any other shape having a leading edge 141 and a trailing edge 149.

The upper cambered surface 125 and the lower cambered surface 133 of the tail rotor housing 112 form a cambered airfoil. The cambered airfoil of the tail rotor housing 112 is designed to produce a lifting force in a thrust direction 161 that counters the torque produced by the main rotor system 114, thereby providing yaw stability to the helicopter 100 without using a traditional vertical stabilizer or fin. As such, tail rotor assembly 106 comprising the tail rotor housing 112 eliminates the need for a traditional vertical stabilizer or fin on helicopter 100. Further, the amount of lifting force generated by the tail rotor housing 112 is substantial as compared to the relatively low surface area provided by the upper cambered surface 125 and the lower cambered surface 133 of the tail rotor housing 112. Accordingly, the aerodynamic design of the tail rotor housing 112 eliminates the need for a traditional vertical stabilizer or fin, since the tail rotor housing 112 is capable of providing sufficient lifting force in the thrust direction 161 during forward flight of the helicopter 100 to offload the tail rotor 108 and provide yaw stability to the helicopter 100. In some embodiments, the lifting force produced by the tail rotor housing 112 in the thrust direction 161 may be equal to or greater than the stabilizing force produced by a traditional vertical stabilizer or fin. By eliminating the traditional vertical stabilizer or fin, both weight of the helicopter 100 and drag on the helicopter 100 during forward flight are reduced as compared to a substantially similar aircraft comprising the traditional vertical stabilizer or fin.

Further, the tail rotor housing 112 allows the tail rotor blades 110 to be completely disposed within the aperture 139 of the tail rotor housing 112. As such, the tail rotor housing 112 is designed to minimize or preferably eliminate exposure of the tail rotor blades 110 to edgewise airflow during forward flight of the helicopter 100. By minimizing or preferably eliminating interaction of the tail rotor blades 110 with the edgewise airflow typically encountered, aerodynamic loads that cause flapping of the tail rotor blades 110 are reduced or eliminated. This allows for a completely rigid rotor hub (both in-plane and out-of-plane) to be used in mounting the tail rotor blades 110 to the tail rotor 108. This simplifies rotor hub design since the rigid rotor hub effectively eliminates pitch-flap coupling, which requires a specific range of delta-3 angles to minimize flapping deflections, and consequently allows for a variety of pitch link attachment locations not traditionally possible. The rigid hub further allows for a variety of configurations and numbers of tail rotor blades 110 to be used on the tail rotor 108 for different applications that would not be possible with a rotor hub subject to rotor blade flapping. Accordingly, different configurations and numbers of tail rotor blades 110 allows the tail rotor assembly 106 to be designed to achieve desired or required noise levels. The tail rotor housing 112 reduces levels of noise produced as compared to traditional open tail rotors and ducted fans. By having the tail rotor blades 110 fully disposed within the aperture 139 of the tail rotor housing 112, the safety of the helicopter 100 is increased, since a person would strike the tail rotor housing 112 before coming into contact with the tail rotor blades 110.

Figure 7:
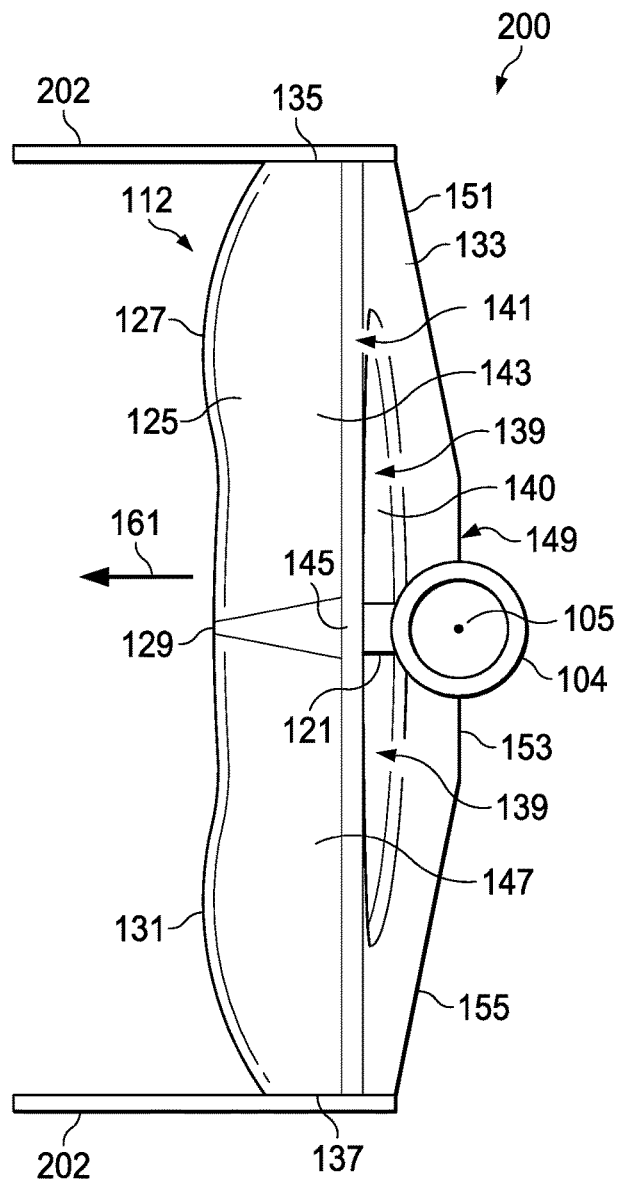
FIG. 7 is a front view of another embodiment of a tail rotor housing according to this disclosure.

Referring to FIG. 7, a front view of another embodiment of a tail rotor housing 200 is shown. Tail rotor housing 200 is substantially similar to tail rotor housing 112 and may be used in the tail rotor assembly 106 of helicopter 100 to provide substantially similar benefits as tail rotor housing 112. However, tail rotor housing 200 comprises winglets 202 extending outwardly away from the tail boom 104 in the thrust direction 161 from each of the top surface 135 and the bottom surface 137. However, in some embodiments, the winglets 202 may extend both outwardly in the thrust direction 161 and inwardly towards the tail boom 104 from each of the top surface 135 and the bottom surface 137. The winglets 202 are generally configured to further reduce the aerodynamic drag associated with vortices that develop at the tail rotor housing 200 during flight. However, the winglets 202 may act as horizontal stabilizers that may minimize or preferably eliminate the need for a traditional horizontal stabilizer. When configured to provide horizontal stabilization, the winglets 202 are preferably centered about the longitudinal axis 105 of the tail boom 104 to minimize or preferably eliminate any rolling moment that could be applied by the winglets 202.

Figure 8:
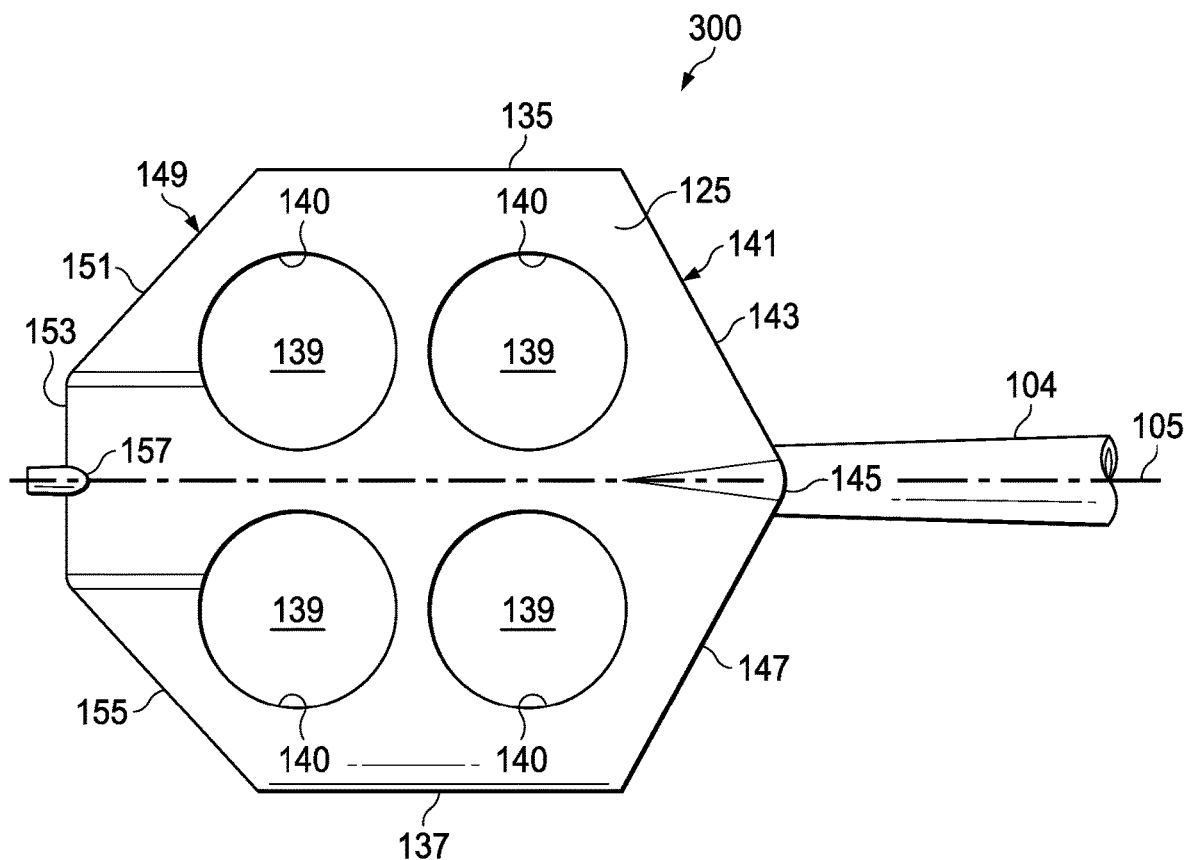
FIG. 8 is a side view of yet another embodiment of a tail rotor housing according to this disclosure.

Referring to FIG. 8, a front view of another embodiment of a tail rotor housing 300 is shown. Tail rotor housing 300 is substantially similar to tail rotor housing 112 and may be used in the tail rotor assembly 106 of helicopter 100 to provide substantially similar benefits as tail rotor housing 112. In some embodiments, tail rotor housing 300 may also comprise winglets 202 and be substantially similar to tail rotor housing 200. However, while tail rotor housings 112, 200 comprise a single aperture 139, tail rotor housing 300 comprises multiple apertures 139, each aperture 139 comprising a walled duct 140 and configured to house a tail rotor 108 and associated tail rotor blades 110. In the embodiment shown, tail rotor housing 300 comprises four apertures 139. However, in other embodiments, tail rotor housing 300 may comprise two, three, or more than four apertures 139. Furthermore, in some embodiments, tail rotor housing 300 may comprise multiple apertures 139 comprising substantially similar or different sizes.

Figure 9:
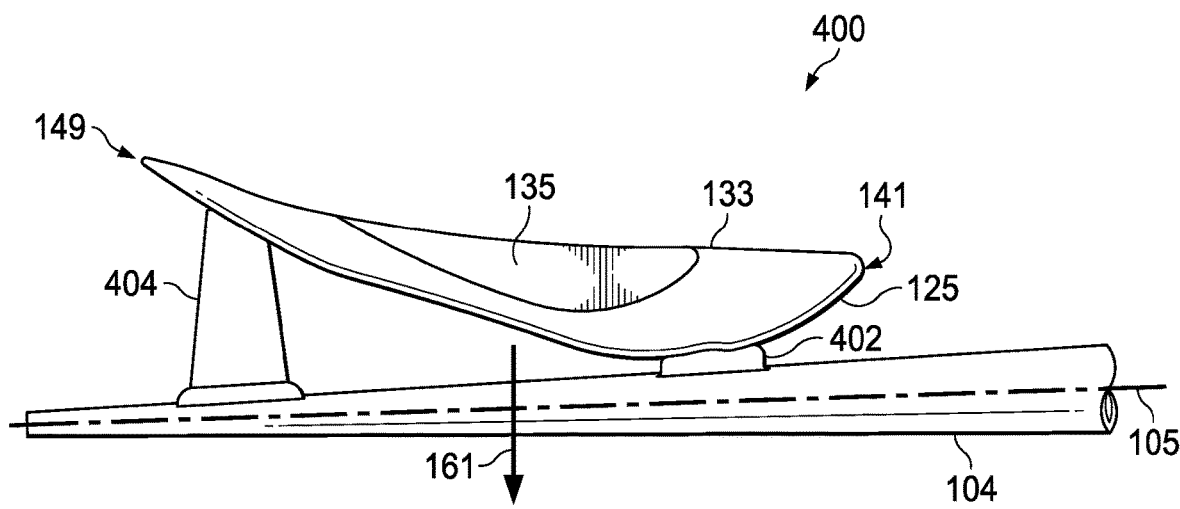
FIG. 9 is a top view of an alternative embodiment of a tail rotor housing according to this disclosure.

Referring to FIG. 9, a top view of an alternative embodiment of a tail rotor housing 400 is shown. Tail rotor housing 400 is substantially similar to tail rotor housing 112 and may be used in the tail rotor assembly 106 of helicopter 100 to provide substantially similar benefits as tail rotor housing 112. In some embodiments, tail rotor housing 300 may also comprise winglets 202 and be substantially similar to tail rotor housing 200. Further, in some embodiments, tail rotor housing 400 may also be substantially similar to tail rotor housing 300 and comprise multiple apertures 139. However, as opposed to tail rotor housings 112, 200, 300 mounted in a "puller" tail rotor configuration, tail rotor housing 400 is mounted on an opposing side of the tail boom 104 by a forward attachment 402 and an aft attachment 404 in a "pusher" tail rotor configuration. Additionally, as opposed to tail rotor housings 112, 200, 300 in which the lower cambered surface 133 provides the mounting surface for tail rotor housing 112 at each of the forward attachment 121 and aft attachment 123, the upper cambered surface 125 provides the mounting surface for tail rotor housing 400 at each of the forward attachment 402 and aft attachment 404.

While shown as helicopter 100, it will be appreciated that the tail rotor housings 112, 200, 300, 400 may be used in any other aircraft that employ a tail rotor 108. This is applicable to both "manned" and "un-manned" aircraft. Additionally, an aircraft may include one or more tail rotor housings 112, 200, 300, 400. Furthermore, it will be appreciated that the tail rotor housings 112, 200, 300, 400 may be retrofit with existing aircraft. Still further, depending on the rotational direction of the main rotor system 114, the tail rotor housings 112, 200, 300, 400 may be mounted on either side of the tail boom 104 to counter the torque produced by the main rotor system 114.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A tail rotor assembly, comprising:
a tail rotor comprising a plurality of tail rotor blades; and
a tail rotor housing comprising:
   a first cambered surface;
   a second cambered surface; and
   an aperture disposed through each of the first cambered surface and the second cambered surface and configured to receive the tail rotor blades;
   wherein the first cambered surface comprises an outwardly curved profile, and the second cambered surface comprises an inwardly curved profile when the tail rotor housing is viewed from above.

2. The tail rotor assembly of claim 1, wherein the tail rotor housing comprises a curved or other aerodynamically shaped top surface and a curved or other aerodynamically shaped bottom surface disposed between the first cambered surface and the second cambered surface on each of a top and bottom of the tail rotor housing, respectively.

3. The tail rotor assembly of claim 1, wherein the tail rotor housing comprises a substantially flat top surface and a substantially flat bottom surface disposed between the first cambered surface and the second cambered surface on each of a top and bottom of the tail rotor housing, respectively.

4. The tail rotor assembly of claim 3, wherein the tail rotor housing comprises at least one winglet extending from each of the top surface and the bottom surface.

5. The tail rotor assembly of claim 1, wherein the tail rotor housing comprises a V-shaped leading edge when the tail rotor housing is viewed from the side.

6. The tail rotor assembly of claim 1, wherein at least a portion of the tail rotor housing intersects at least a portion of a tail boom.

7. The tail rotor assembly of claim 1, wherein the tail rotor housing is configured to minimize exposure of the tail rotor blades to edgewise airflow.

8. The tail rotor assembly of claim 7, wherein the tail rotor housing is capable of providing sufficient lifting force in a thrust direction during forward flight to offload the tail rotor.

9. The tail rotor assembly of claim 8, wherein the tail rotor housing is free of a traditional vertical stabilizer or fin.

10. A helicopter, comprising:
   a fuselage; and
   a tail boom extending from the fuselage;
   a tail rotor comprising a plurality of tail rotor blades; and
   a tail rotor housing comprising:
      a first cambered surface;
      a second cambered surface; and
      an aperture disposed through each of the first cambered surface and the second cambered surface and configured to receive the tail rotor blades;
      wherein the first cambered surface comprises an outwardly curved profile, and the second cambered surface comprises an inwardly curved profile when the tail rotor housing is viewed from above.

11. The helicopter of claim 10, wherein a front profile of the first cambered surface comprises a varying width.

12. The helicopter of claim 11, wherein the tail rotor housing comprises a curved or other aerodynamically shaped top surface and a curved or other aerodynamically shaped bottom surface disposed between the first cambered surface and the second cambered surface on each of a top and bottom of the tail rotor housing, respectively.

13. The helicopter of claim 11, wherein the tail rotor housing comprises a substantially flat top surface and a substantially flat bottom surface disposed between the first cambered surface and the second cambered surface on each of a top and bottom of the tail rotor housing, respectively.

14. The helicopter of claim 13, wherein the tail rotor housing comprises at least one winglet extending from each of the top surface and the bottom surface.

15. The helicopter of claim 10, wherein the tail rotor housing intersects at least a portion of the tail boom.

16. The helicopter of claim 10, wherein the aperture comprises a walled duct connecting the first cambered surface and the second cambered surface, and wherein the tail rotor blades are disposed entirely within the aperture.

17. The helicopter of claim 16, wherein the tail rotor housing is configured to minimize exposure of the tail rotor blades to edgewise airflow.

18. The helicopter of claim 17, wherein the tail rotor housing produces a lifting force in a thrust direction that counters the torque produced by a main rotor system of the helicopter.

19. The helicopter of claim 17, wherein the tail rotor housing is capable of providing sufficient lifting force in a thrust direction during forward flight of the helicopter to offload the tail rotor.

20. The helicopter of claim 19, wherein the tail rotor housing is free of a traditional vertical stabilizer or fin.

* * * * *